United States Patent [19]
Brown et al.

[11] Patent Number: 4,964,918
[45] Date of Patent: Oct. 23, 1990

[54] GROUTING COMPOSITION

[75] Inventors: Richard K. Brown; Robert W. Stichman, both of Billings, Mont.

[73] Assignee: Wyo-Ben, Inc., Billings, Mont.

[21] Appl. No.: 235,422

[22] Filed: Aug. 12, 1988

[51] Int. Cl.$^5$ .............................................. C04B 28/00
[52] U.S. Cl. .................... 106/811; 106/669; 106/803; 106/811; 106/900; 166/292
[58] Field of Search ................. 106/85, 900, DIG. 4; 166/292

[56] References Cited

U.S. PATENT DOCUMENTS

| | | | |
|---|---|---|---|
| 2,861,636 | 11/1958 | Messenger | 106/85 |
| 3,028,913 | 4/1962 | Armentrout | 166/292 |
| 3,111,006 | 11/1963 | Caron | 106/900 |
| 3,986,365 | 10/1976 | Hughes | 106/900 |
| 4,463,808 | 8/1984 | Mason et al. | 106/292 |
| 4,797,158 | 1/1989 | Harriett . | |

OTHER PUBLICATIONS

Clays and Clay Technology Proceedings of 1st National Conference on Clays & Clay Technology, Edited by Joseph A. Pask & Mort D. Turner, Jul. 1953.
Dilling Practices Manual, Ed. Preston L. Moore, The Petroluem Publishing Co. 1974), pp. 117–121.
Composition & Properties of Oil Well Drilling Fluids, 4th Edition Ed. Gray & Darley, pp. 564–567.
Composition & Properties of Oil Well Drilling Fluids by Walter F. Rogers Gulf Pub. Co. 1953, pp. 310–319.
Circulating Systems-Rotary Drilling-Ed. Jodie Leecroft: Unit I Lesson 8, p. 15, Pub. by Peholevan Extension Service, Autsin, Tex., 1981.
Principles of Drilling Fluid Control, 12th Edn. Pub. by Petroleum Extension Service, Austin, Tex., p. 76.
Report of the Oil & Gas Conservation Commission of the State of Wyoming, Docket No. 113–80, 8/6/80.

*Primary Examiner*—William R. Dixon, Jr.
*Assistant Examiner*—David M. Brunsman
*Attorney, Agent, or Firm*—Aisenberg & Platt

[57] ABSTRACT

A grouting composition for sealing a borehole or other cavity comprising 90–99.9% finely divided water swellable clay and 0.1–10% thinner. The grouting composition is mixed with fresh water to provide a completely reswellable, unflocculated, easily placed, low permeability sealing composition. The thinner allows a very high concentration of water-swellable clay in the composition. A preferred grouting composition comprises 98–99.9% sodium bentonite and 0.1–2% polyacrylate thinner. In use, 50 lb. of the preferred grouting composition is mixed with 11–14 gallons fresh water, to provide a grouting mixture which comprises about 30–35% reswellable solids.

24 Claims, No Drawings

GROUTING COMPOSITION

FIELD OF THE INVENTION

The invention relates to a grouting composition for sealing earthen boreholes and other subsurface cavities.

BACKGROUND OF THE INVENTION

Grouting compositions have been used for many years to minimize movement of water or other fluids into, through and out of wells and other subsurface cavities. Grouts have also been used to limit the movement of water and other fluids into buried foundations and other subsurface structures. Grout compositions incorporating bentonite are known to exhibit the characteristic of low permeability to fluids. In these compositions the degree of impermeability is directly related to the amount of bentonite present. Prior to the development of this invention, high concentrations of bentonite in grout mixtures have made the mixtures rapidly become too thick, viscous and sticky to be useful. Such mixtures can quickly clog pumping equipment and related conveying hoses and pipes, making them unusable.

Mason, U.S. Pat. No. 4,463,808, describes a composition in which bentonite, especially granular bentonite, or other water swellable clay is added to a premixed water and polymer solution. The polymer is a water dispersable hydrolyzed polyacrylamide which inhibits the swelling of the clay for a sufficient period of time to allow the fluid grout thus produced to be placed at the desired location in the well borehole. Granular bentonite is stated to be particularly desirable for use in this composition because finely ground bentonite swells more rapidly and must be more rapidly emplaced in the well bore. The amount of bentonite indicated for this composition is from 2 to 4 pounds per gallon of water.

Harriett, U.S. Pat. Nos. 4,696,698 and 4,696,699, describes grouting compositions containing up to 80% bentonite or other water swellable clay, with up to 80% non-swelling particulate fillers such as fly ash, diatomaceous earth or calcined clays, up to 35% water soluble silicates as solidifiers, up to 35% gelling agents such as magnesium oxide or soda ash and up to 35% multivalent cation source. This composition optionally uses sodium pyrophosphate as a dispersing agent for the water swellable clay. Harriett cautions against the use of polymer treatment of the water swellable clay using salts of polyacrylic acid and other polymer agents in order to avoid premature gelling of the composition.

SUMMARY OF THE INVENTION

The present invention is directed to an easily prepared, one part, water mixable, easily pumped and placed, grout composition which exhibits low permeability to water and other ground fluids and contains a very high content of water swellable, fully reswellable, colloidal clay solids. The composition of the invention contains 90.0-99.9% of a water swellable, colloidal clay, such as bentonite, and 0.1.-10% of a thinner, such as certain low molecular weight polyacrylate polymers, where the percentages are by weight of the composition prior to mixing with water. The thinner functions as an agent for significantly increasing the content of water swellable colloidal clay solids in the prepared grout mixture beyond that obtainable without such a thinner. The grout mixture is prepared by adding 50 lb. grout mixture composition to 9-18 gallons of water, preferably to 11-14 gallons of water, to provide a grout mixture having about 25-40% reswellable solids. No gelling or flocculating agents are used in the composition of the invention, resulting in uninhibited reswelling potential of the prepared grout upon rehydration following shrinkage due to desiccation. The invention is useful, for example, as a grouting, cementing or plugging agent in boreholes around well casings during well development, in boreholes during well abandonment procedures in order to prevent fluid movement within the borehole and stabilize the well, and for waterproofing foundations and other subsurface earthen structures which may come in contact with ground fluids. The composition of the invention is useful in any subsurface condition or environment where it is necessary to limit fluid movement or contact of structures with fluids.

DETAILED DESCRIPTION OF THE INVENTION

A composition of the present invention is used, for example, for grouting well casings where the annular well space between the casing and the borehole wall must be sealed, for grouting monitoring well boreholes where sections of the borehole must be sealed, and for grouting well boreholes during well abandonment to fully seal the entire borehole. The grouting composition of the present invention is also used for grouting, pressure grouting and sealing subgrade foundation structures in order to limit their contact with, and permeability to, ground water and other fluids. Further, the present invention may be used in any subgrade application where it is desirable or necessary to limit the movement of ground water or other fluids.

The composition of the present invention is also used as a flexible, low permeability backfilling and plugging material for use in cementing conduit and cables in subsurface trenches or boreholes, and as an electrically transmissive medium for back filling around electrical grounding devices.

The preferred grout composition of the invention consists of a water swellable clay, such as bentonite, in an amount of 98.0 to 99.9% by weight and a water dispersible polyacrylate thinner in an amount of 0.1 to 2% by weight. No gelling or flocculating agents, or non-swellable fillers of any kind are used. This composition is added to 11-14 gallons of fresh water to provide a grout mixture having about 30-35% reswellable solids.

The water swellable clays useful in the composition of the present invention include any colloidal clay mineral which will swell upon hydration with water. The colloidal clay may be any member of the dioctahedral or trioctahedral smectite group or mixtures thereof, including bentonite (montmorillonite), beidellite, nontronite, hectorite and saponite. Additionally, the clay may also be attapulgite or sepiolite or a mixture of these two clay minerals, or a mixture of these clay minerals with one or more minerals of the smectite group.

In its preferred embodiment the colloidal clay mineral is sodium bentonite (sodium montmorillonite) which is finely ground so that approximately 80%, by weight, will pass through a 200 mesh U.S. standard sieve. The fine grind of colloidal clay aids in its rapid mixing with and dispersion in water. A finely ground colloidal clay is also preferred in order to limit the problems encountered when coarser granular colloidal clays are used, wherein the large clay particles become sticky upon hydration and, being unable to rapidly disperse in the mixing water due to their large size, may aggregate, by particle to particle adhesion, and cause plugging of the pumping equipment and the conveying and placement pipes, tubes and hoses. Notwithstanding the use of finely ground clay in the preferred embodiment of the invention, granular clay may also be used with equal success providing that it is thoroughly mixed with the water prior to placement until the clay is substantially dispersed and few coarse particles remain in the mix. The problem of particle to particle adhesion observed in a water and clay mixture when granular bentonite is used, is overcome by the use of finely ground colloidal clay because clumps of finely ground clay particles, formed by particle to particle adhesion are easily broken up and do not clog pumping and conveying equipment.

As a result, in its preferred embodiment, a composition of the invention may be placed within the ground cavity, by pumping, immediately after adding the finely ground dry clay to the mix water, while the mix is still very lumpy and before substantial mixing and dispersion of the clay solids in the mix water has occurred. Alternatively, the mixture may be mixed until the clay solids are fully dispersed in the mix water, yielding a thick, paste-like consistency, before placement in the ground cavity. The amount of mixing and degree of dispersion of the clay solids in the mix water does not affect the placement characteristics or the sealing capability of the composition in any way.

When dispersed in an aqueous solution water swellable colloidal clay crystals become oriented in positions of minimum free energy. Most commonly this results in positively charged crystal edges being oriented toward the negatively charged crystal surfaces of adjacent clay crystals. In the absence of agitation this orientation results in the formation of gels in the clay suspension. Both the rate of gel formation and the ultimate viscosity of the gel are dependent upon the concentration and type of electrolytes present in the suspending water and the concentration of clay. Higher concentrations of electrolyte and/or clay yield more rapidly forming and higher viscosity gels.

Clay thinners function by bonding of negatively charged sites on the thinner molecule with positively charged sites exposed on the edges of each clay crystal through the process of chemisorption. This bonding masks the positive charge on the clay crystal edge and inhibits the orientation of the clay crystals into gel forming structures thereby keeping the clay crystals dispersed in the suspending water in a low viscosity fluid form.

In the composition of the present invention the thinner is used to maximize clay crystal dispersion in order to reduce initial viscosity and delay the onset of gel formation. Thus, a much higher concentration of water swellable colloidal clay solids may be added to the water mix than would otherwise be possible. Water swellable colloidal clay solids contents of about 25 to 40% may be achieved through proper balancing of the thinner and clay components of the invention. The actual concentration of water swellable colloidal clay solids achieved is also a function of the specific application requirements and of the type of mixing, pumping and conveying equipment used. The high water swellable colloidal clay solids content mixture thus obtained will remain pumpable indefinitely for as long as the mixture is continuously agitated. It will also remain pumpable for an hour or more in the absence of agitation.

In its preferred embodiment, the thinner used in the present invention is a water dispersible, sodium salt of a narrow polydispersity polymeric carboxylic acid with a low molecular weight in the range of 2,000 to 5,000. Polymer thinners are distinguished from other clay thinning agents by their efficiency of activity i.e., very small amounts of polymer thinner yield significant thinning affects. The polymer thinner used in the preferred embodiment of the invention is distinguishable from other polymer thinners by virtue of its very narrow molecular weight range which yields increased efficiency of thinning when compared with other polymer thinning agents. Polymer thinners are distinguished from other polymeric clay treating agents by their very low molecular weight which, for commercial applications is under 10,000, by their chemical makeup which consists of highly anionic polyacrylate polymers having at least 60% anionic carboxyl groups, and by their method of activity which causes them to bind extensively to the positively charged clay crystal edges and inhibit the formation of gel structures in clay slurries, thus allowing a higher concentration of clay particles to be dispersed in the water.

Other polymeric clay treatments, such as those of the prior art which inhibit swelling by inhibiting water absorption of the clay, have significantly higher molecular weights which, for commercial applications, usually are over 1,000,000, and have chemical compositions which are only about 25-40% anionic and are either partially hydrolyzed polyacrylamide or are polyacrylate-polyacrylamide copolymers, and which function by encapsulating the clay particles, binding them together and reducing the rate of water movement into the particle.

Research has shown that polyacrylates of the type used in this invention are poor inhibitors of swelling for water swellable clays due to their relatively low molecular weight, resultant short molecule length and high charge density, but that they are good thinners of water swellable clays due to their ability to inhibit the formation of gel structures.

In contrast, research has also shown that partially hydrolized polyacrylamide or polyacrylate-polacrylamide copolymers, which are about 25-40% anionic such as those used in the prior art, are very good inhibitors of swelling for water swellable clays due to their high molecular weight, resultant very long molecule length and much lower charge density and, that they are very poor water swellable clays thinners due to their inability to fully mask the positive charges on the clay particle edges and thereby inhibit particle to particle orientation and resultant gel formation.

The use of a polymer thinner in the preferred embodiment of the invention is only one embodiment of the invention and does not preclude the use of other thinner materials. Other suitable thinners include phosphate thinners, including simple phosphates, polyphosphates, organophosphates, phosphonates and related phosphate compounds, tannins, lignite (leonardite), and lignosulfonates, where the usage rate of these other thinner materials is between 0.1 and 10% of the dry grout mix. Additional embodiments of the present invention also include mixtures of two or more of the thinning agents.

EXAMPLE

An exemplary grout composition may be prepared by mixing in a suitable mixer 99.7% untreated sodium bentonite clay having a moisture content of 8.0%, which has been finely ground such that 80% passes a U.S. Standard 200 mesh sieve, and 0.3% water dispersible, narrow polydispersity, sodium polyacrylate polymer with a molecular weight in the range of 2,000 to 5,000. 50.0 Pounds of this dry composition is added to 12.2 gallons of fresh water to make up a grout slurry which contains approximately 30% fully swellable and reswellable sodium bentonite solids. The percentage of materials in the grout slurry thus prepared, as a percent by weight of the entire grout composition, is approximately 69.6% water, 30.3% sodium bentonite and 0.1% polymer. The dry grout composition has the following typical chemical analysis:

|  | Percent |
| --- | --- |
| $SiO_2$ | 61.47 |
| $Al_2O_3$ | 19.42 |
| $Fe_2O_3$ | 3.93 |
| $Na_2O$ | 3.04 |
| $MgO$ | 1.72 |
| $CaO$ | 1.14 |
| $K_2O$ | 0.73 |
| $TiO_2$ | 0.22 |
| Other | 0.33 |
| Water | 8.00 |

The grout composition thus prepared may be placed either immediately after the dry solids are added to the water while the mixture is still very lumpy, or after mixing until the mixture is of a smooth consistency. This composition remains pumpable indefinitely as long as it is continuously agitated in the mixer. When fully mixed the composition will remain pumpable for approximately one hour in the absence of any agitation. The composition may be effectively pumped to any depth in any hole or cavity of sufficient size to allow passage of the grout conveying tube or pipe. When emplaced the composition will form a plastic seal exhibiting a water permeability of $1 \times 10^{-8}$ cm./sec., or less. This composition may be placed in a ground cavity, by pumping, immediately after adding the finely ground dry clay to the mix water, while the mix is still very lumpy and before substantial mixing and dispersing of the clay solids in the mix water has occurred, or the mixture may be mixed until the clay solids are fully dispersed in the mix water, yielding a thick, paste-like consistency before placement in the ground cavity. The high water swellable colloidal clay solids content mixture thus obtained will remain pumpable indefinitely for as long as the mixture is continuously agitated. It will also remain pumpable for an hour or more in the absence of agitation. The amount of mixing and degree of dispersion of the clay solids in the mix water does not affect the placement characteristics of the sealing capability of the composition in any way. The composition is used as a flexible, low permeability plugging material, and will retain the capacity to fully reswell upon hydration following shrinkage due to desiccation.

It should be understood that variations and modifications may be made without departing from the spirit, scope or intent of the invention. The foregoing embodiment is, therefore, considered to be illustrative and not restrictive of the invention.

What is claimed is:

1. A reswellable grouting composition which, when mixed with water, is useful for effecting a seal in an earthen borehole or other subsurface cavity, wherein the composition consists essentially of 90.0-99.9% water swellable clay and 0.1-10.0% thinner, wherein the thinner comprises at least one member selected from the group consisting of phosphates, polyphosphates, organophosphates, phosphonates, tannins, ligonites, leonardite, lignosulfonates, and polyacrylates having a molecular weight of less than about 10,000, where the percentages are by weight of the composition prior to mixing with water.

2. A composition of claim 1 wherein the water swellable clay comprises at least one member selected from the group consisting of Beidellite, Nontronite, Hectorite, Saponite, Attapulgite, Sepiolite and Bentonite (Montorillonite).

3. A composition of claim 2 wherein the water swellable clay comprises sodium bentonite.

4. A composition of claim 1 wherein the thinner comprises sodium polyacrylate.

5. A composition of claim 1 wherein the water swellable clay is finely ground wherein at least 80% passes a 200 mesh U.S. Standard sieve.

6. A grouting composition which, when mixed with water is useful for effecting a seal in an earthen borehole or other subsurface cavity, wherein the composition comprises 90.0-99.9% water swellable clay and 0.1-10.0% thinner, where the percentages are by weight of the composition prior to mixing with water,
wherein the thinner comprises at least one member selected form the group consisting of simple phosphates, polyphosphates, organophosphates, phosphonates, tannins, lignites, leonardite, lignosulfonates and polyacrylates, and
wherein the thinner comprises a polyacrylate comprising a water dispersible, narrow polydispersity sodium salt of a polymeric carboxylic acid having a molecular weight in the range of 2,000 to 5,000.

7. A reswellable grouting composition which, when mixed with water, is useful for effecting a seal in an earthen borehole or other subsurface cavity, the composition consisting essentially of 98.0-99.9% finely divided bentonite and 0.1 to 2.0% polyacrylate thinner, where the percentages are by weight prior to mixing with water.

8. A grouting composition of claim 7 wherein the bentonite comprises sodium bentonite.

9. A grouting composition of claim 8 wherein 80% of the finely divided sodium bentonite passes through a 200 mesh U.S. standard sieve.

10. A grouting composition which, when mixed with water, is useful for effecting a seal in an earthen borehole or other subsurface cavity, the composition comprising 90.0-99.9% finely divided bentonite and 0.1 to 10.0% polyacrylate thinner, where the percentages are by weight prior to mixing with water,
wherein the thinner comprises a water dispersible, narrow polydispersity sodium salt of a polymeric carboxylic acid with a molecular weight in the range of 2,000 to 5,000.

11. A reswellable grouting mixture comprising 50 lb. premixed grouting composition consisting essentially of, by weight, 90.0-99.9% water swellable clay and 0.1-10% thinner, mixed with 9-18 gallons of fresh water, wherein the grouting mixture comprises about 25-40% reswellable solids.

12. A grouting mixture of claim 11 wherein the grouting composition consists essentially of 98.0–99.9% sodium 0bentonite and 0.1–2.0% polyacrylate thinner having a molecular weight of less than about 10,000.

13. A grouting mixture of claim 11 comprising 30–35% reswellable solids.

14. A method of forming an unflocculated, fully reswellable grouting mixture useful for effecting a seal in an earthen borehole or other subsurface cavity, comprising adding a premixed grouting composition consisting essentially of 90.0–99.9% water swellable clay and 0.1–10.0% thinner to fresh water in the proportion of 50 lb. grouting composition to 9–18 gallons of fresh water, agitating the mixture until at least some of the composition is fully dispersed, and pumping the mixture into the subsurface cavity.

15. A method of claim 14, wherein the grouting mixture is unflocculated and fully reswellable and comprises about 25–40% reswellable solids.

16. A grouting mixture comprising 50 lb. premixed grouting composition comprising, by weight, 90.0–99.9% water available clay and 0.1–10% thinner, mixed with 9–18 gallons of fresh water, wherein the thinner comprises a water-dispersible, sodium salt of a narrow polydispersity, low molecular weight polymeric carboxylic acid, having a molecular weight in the range of 2,000 to 5,000.

17. A grouting mixture of claim 16 comprising about 25–40% reswellable solids.

18. A grouting mixture of claim 17 wherein the grouting composition comprises 98.0–99.9% finely divided sodium bentonite wherein 80% passes a 200 mesh U.S. standard sieve and 0.1–2.0% water-dispersible, sodium salt of a narrow polydispersity, low molecular weight polymeric carboxylic acid, having a molecular weight in the range of 2,000 to 5,000.

19. A method of forming an unflocculated, fully reswellable grouting mixture useful for effecting a seal in an earthen borehole or other subsurface cavity, comprising adding a premixed grouting composition of 90.0–99.9% water swellable clay and 0.1–10.0% thinner to 9–18 gallons of fresh water, agitating the mixture until at least some of the composition is fully dispersed, and pumping the mixture into the subsurface cavity,
wherein the thinner comprises a water dispersible, sodium salt of a narrow polydispersity polymeric carboxylic acid having a molecular weight in the range of 2,000–5,000.

20. A method of claim 19, comprising mixing the grouting composition with 11–14 gallons of fresh water.

21. A method of claim 20 wherein the grouting composition comprises 98.0–99.9% finely divided sodium bentonite and 0.1–2.0% thinner.

22. A method of claim 19 wherein the grouting mixture is unflocculated and fully reswellable and comprises about 30–35% reswellable solids.

23. A reswellable grouting composition which, when mixed with water, is useful for effecting a seal in an earthen borehole or other subsurface cavity, wherein the composition consists essentially of 90.0–99.9% water swellable clay and 0.1–10.0% polyacrylate thinner having a molecular weight of less than about 10,000.

24. A reswellable grouting composition which, when mixed with water, is useful for effecting a seal in an earthen borehole or other subsurface cavity, wherein the composition consists essentially of 90.0–99.9% water swellable clay and 0.1–10.0% phosphate thinner.

* * * * *